US00RE47627E

(19) United States
(12) Reissued Patent
Skotty

(10) Patent Number: US RE47,627 E
(45) Date of Reissued Patent: Oct. 1, 2019

(54) HINGED RAIL FOR BARRIER OPERATORS

(71) Applicant: The Chamberlain Group, Inc., Oak Brook, IL (US)

(72) Inventor: Brian Roy Skotty, Elmhurst, IL (US)

(73) Assignee: The Chamberlain Group, Inc., Oak Brook, IL (US)

(21) Appl. No.: 15/585,415

(22) Filed: May 3, 2017

Related U.S. Patent Documents

Reissue of:
(64) Patent No.: 9,021,740
Issued: May 5, 2015
Appl. No.: 13/599,287
Filed: Aug. 30, 2012

(51) Int. Cl.
*E05D 15/38* (2006.01)
*E05F 15/686* (2015.01)

(52) U.S. Cl.
CPC ..... *E05F 15/686* (2015.01); *E05Y 2201/626* (2013.01); *E05Y 2201/684* (2013.01); *E05Y 2600/322* (2013.01); *E05Y 2900/106* (2013.01); *Y10T 16/373* (2015.01)

(58) Field of Classification Search
CPC ..... E05F 15/686
USPC ..... 49/197, 199, 409; 160/188, 209, 201; 16/96 R, DIG. 1, 102, 94 R, 95 R; 104/108, 91
See application file for complete search history.

(56) References Cited

U.S. PATENT DOCUMENTS 797,031 A * 8/1905 Vivian ..... E05D 15/0652 16/96 R
1,698,424 A 1/1929 Banschbach
2,040,080 A * 5/1936 Collins ..... E05D 15/246 160/191
2,574,684 A * 11/1951 Andrews et al. ..... 200/47
2,628,090 A 2/1953 Verdier
2,703,236 A 3/1955 Verdier
2,755,081 A 7/1956 Johnson et al.
2,909,718 A 10/1959 Lawick
3,059,485 A 10/1962 Bohlman et al.
3,348,336 A 10/1967 Hashagen
3,471,971 A * 10/1969 Richmond ..... 49/199
3,481,074 A 12/1969 Moss
3,584,414 A * 6/1971 Bahnsen ..... 49/272
3,695,332 A * 10/1972 Bahnsen ..... 160/188
3,708,917 A * 1/1973 Streeter ..... E05F 15/668 49/199
3,955,661 A * 5/1976 Popper et al. ..... 192/150
3,958,367 A * 5/1976 Fairman ..... 49/197
4,102,382 A 7/1978 Vesbach
4,167,833 A 9/1979 Farina et al.
4,241,540 A 12/1980 Depperman
4,414,778 A * 11/1983 Carli ..... 49/199
(Continued)

OTHER PUBLICATIONS

DIY Garage Repair; Super Low Headroom garage Door Kit; from http://www.diygaragerepair.com/Low-Headroom-Garage-Door-Parts-s/11t6.htm and known at the earliest Sep. 2011.

*Primary Examiner* — Robert M Fetsuga
(74) *Attorney, Agent, or Firm* — Fitch, Even, Tabin & Flannery LLP

(57) ABSTRACT

A movable barrier system wherein the trolley system comprises at least two guiding rail portions. At least one of the guiding rail portions is supported by a support member secured to the headroom area of the building support structure. The trolley traverses the at least two guiding rail portions by a hinged coupling device.

5 Claims, 13 Drawing Sheets

(56) References Cited

U.S. PATENT DOCUMENTS

| | | | | |
|---|---|---|---|---|
| 4,597,428 | A | 7/1986 | Iha | |
| 4,628,636 | A * | 12/1986 | Folger | 49/199 |
| 4,653,565 | A | 3/1987 | Iha et al. | |
| 4,805,344 | A * | 2/1989 | Hrboka | 49/280 |
| 4,813,305 | A * | 3/1989 | Dilich | 74/581 |
| 4,819,379 | A * | 4/1989 | Kenzelmann et al. | 49/280 |
| 4,891,908 | A * | 1/1990 | Aquilina | 49/199 |
| 5,239,776 | A * | 8/1993 | Lhotak | 49/199 |
| 5,568,704 | A * | 10/1996 | Williams et al. | 49/362 |
| 5,588,257 | A * | 12/1996 | Duhame et al. | 49/199 |
| 5,596,840 | A | 1/1997 | Teich | |
| 6,041,845 | A * | 3/2000 | Couch | 160/201 |
| 6,047,761 | A * | 4/2000 | Jaehnen | E05D 15/165 160/201 |
| 6,092,338 | A | 7/2000 | Crowner et al. | |
| 6,173,532 | B1 * | 1/2001 | Beausoleil | 49/199 |
| 6,346,889 | B1 * | 2/2002 | Moss | 340/686.1 |
| 6,651,385 | B2 | 11/2003 | Miller et al. | |
| 6,662,499 | B1 * | 12/2003 | Shin et al. | 49/26 |
| 6,779,306 | B2 | 8/2004 | Hormann | |
| 6,897,630 | B2 * | 5/2005 | Murray et al. | 318/434 |
| 7,059,379 | B2 * | 6/2006 | Lewis, Jr. | E05D 15/24 16/401 |
| 7,076,917 | B2 * | 7/2006 | Chang | 49/139 |
| 7,260,917 | B2 * | 8/2007 | Brookbank et al. | 49/506 |
| 7,525,267 | B2 * | 4/2009 | Angiuli et al. | 318/282 |
| 7,537,042 | B2 * | 5/2009 | Altimore | 160/191 |
| 7,721,387 | B1 * | 5/2010 | Mullet et al. | 16/96 R |
| 8,438,784 | B1 * | 5/2013 | Marinelli | 49/199 |
| 8,561,348 | B2 * | 10/2013 | Kurth et al. | 49/30 |
| 8,689,486 | B2 * | 4/2014 | Menning | 49/199 |
| 2004/0211033 | A1 * | 10/2004 | Mullet et al. | 16/96 R |
| 2008/0083167 | A1 * | 4/2008 | Olmsted et al. | 49/199 |
| 2009/0260291 | A1 * | 10/2009 | Hawkins et al. | 49/199 |
| 2010/0058669 | A1 * | 3/2010 | Cole | 49/199 |
| 2010/0107498 | A1 * | 5/2010 | Ley | 49/199 |
| 2014/0083017 | A1 * | 3/2014 | Skotty | 49/506 |

* cited by examiner

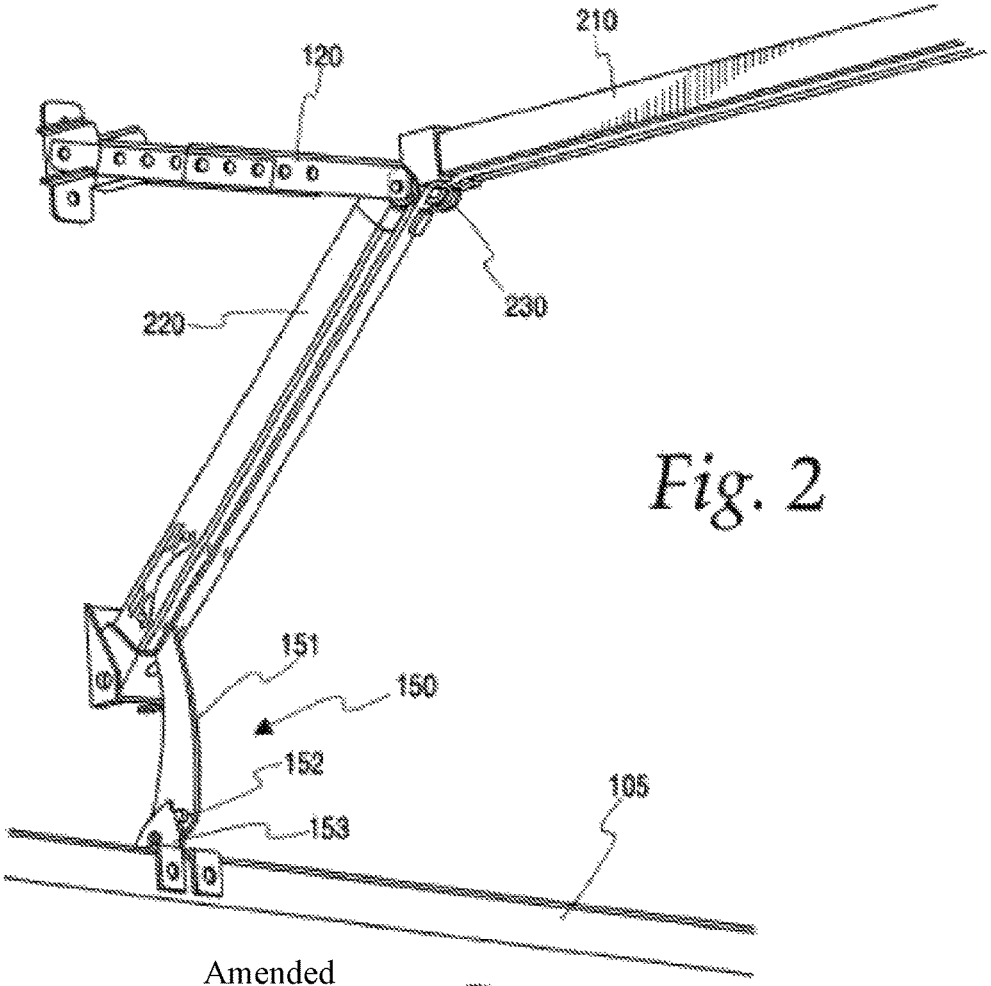
Fig. 2
Amended

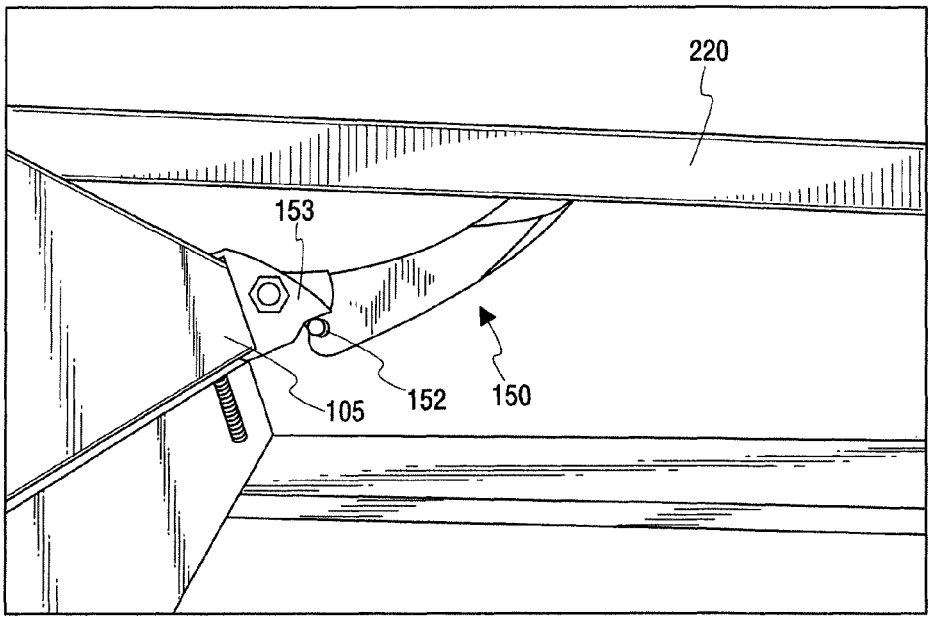
Fig. 3b
Fig. 3c
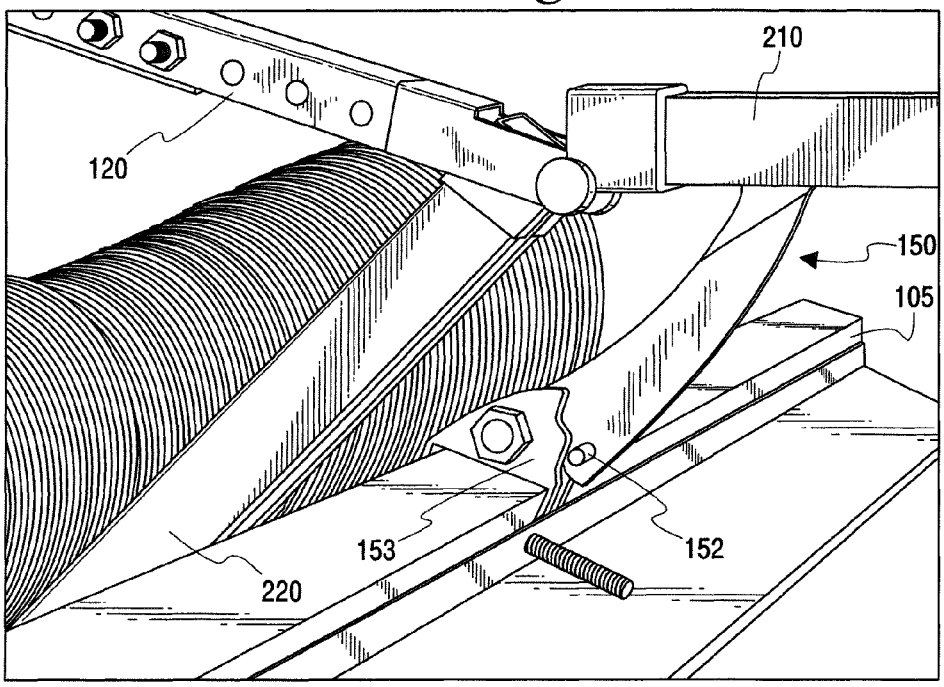

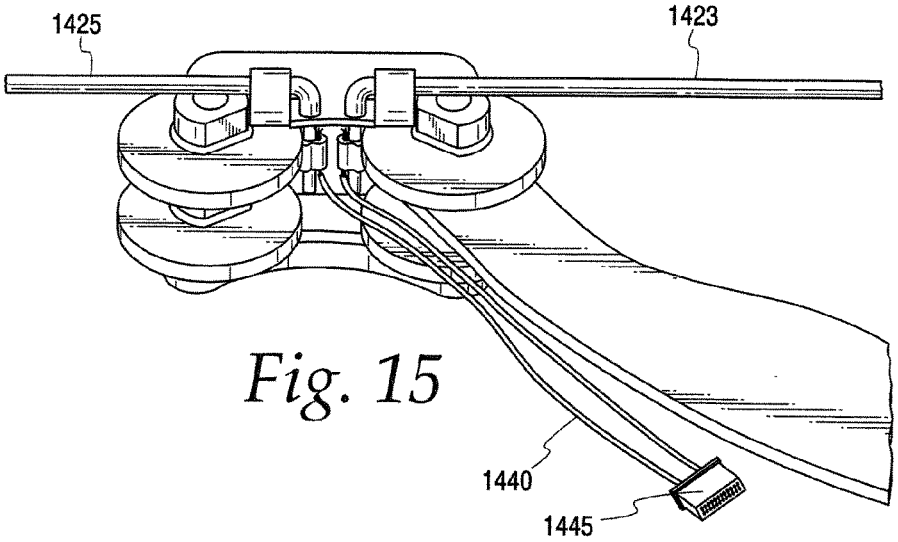
Fig. 15
Fig. 17
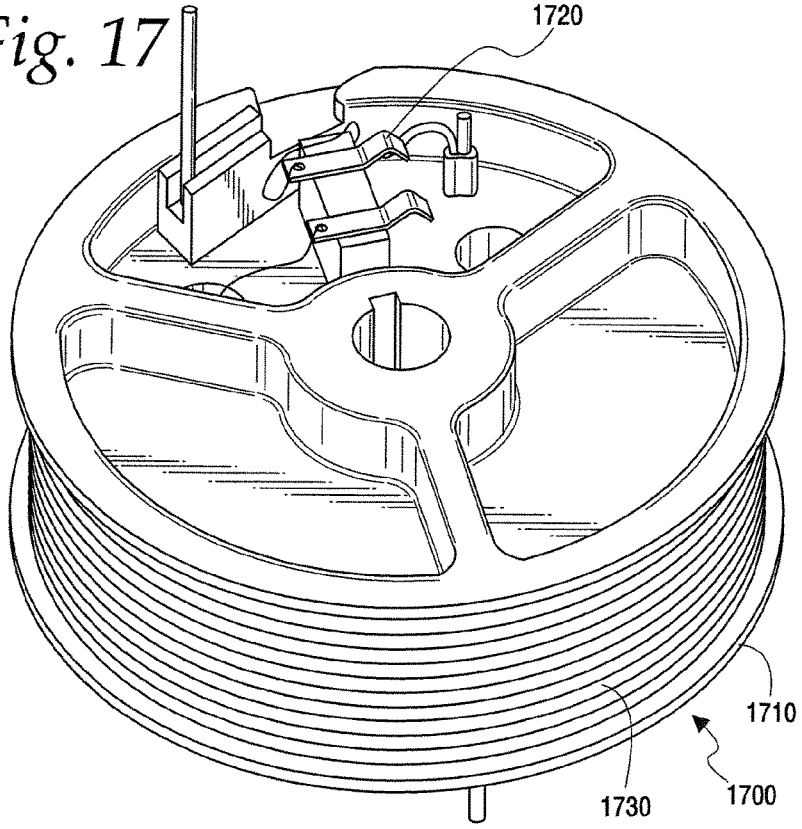

HINGED RAIL FOR BARRIER OPERATORS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This application is a reissue application of U.S. Pat. No. 9,021,740, which issued on May 5, 2015 from U.S. patent application Ser. No. 13/599,287, filed on Aug. 30, 2012, which is hereby incorporated by reference as if fully set forth herein.*

TECHNICAL FIELD

This invention relates generally to an operator and rail assembly for raising and lowering a movable barrier, and specifically to the use of a hinged rail trolley operator system to raise and lower a movable barrier.

BACKGROUND

Movable barrier systems are generally known in the industry. One example of such system is a garage door opener. There are several different styles of garage door operators. These operators are typically separated into jackshaft operators and trolley operators. Jackshaft operators attach to the jackshaft of the door, and are generally mounted at the end of the jackshaft. Trolley operators utilize a rail that is attached to and extends from the header, or the area above the barrier, to the operating mechanism.

In certain configurations, there may be a limited amount of headroom, the distance from the top of the garage door to the ceiling, to utilize a standard trolley type system. Doing so can result in a cumbersome installation process. Additionally, when the barrier door follows the track from the vertical (closed) to horizontal (open) position, forces on the trolley rail near the barrier opening require a considerable amount of reinforcement, including using thicker and stronger trolley rail materials in addition to using additional means to secure the trolley rail such as to a ceiling, to provide safe travel of the door.

BRIEF DESCRIPTION OF THE DRAWINGS

The above needs are at least partially met through provision of the hinged rail for barrier operators described in the following detailed description, particularly when studied in conjunction with the drawings, wherein:

FIG. 2 comprises a perspective view of an example hinged rail and trolley for barrier operators as configured in accordance with various embodiments of the invention;

FIG. 3b comprises a perspective view of an example trolley as configured in accordance with various embodiments of the invention;

FIG. 3c comprises a perspective view of an example trolley as configured in accordance with various embodiments of the invention;

FIG. 15 comprises a schematic view of a portion of an example trolley system as configured in accordance with various embodiments of the invention.

FIG. 17 comprises a schematic view of a portion of an example operator as configured in accordance with various embodiments of the invention.

Figure 1:
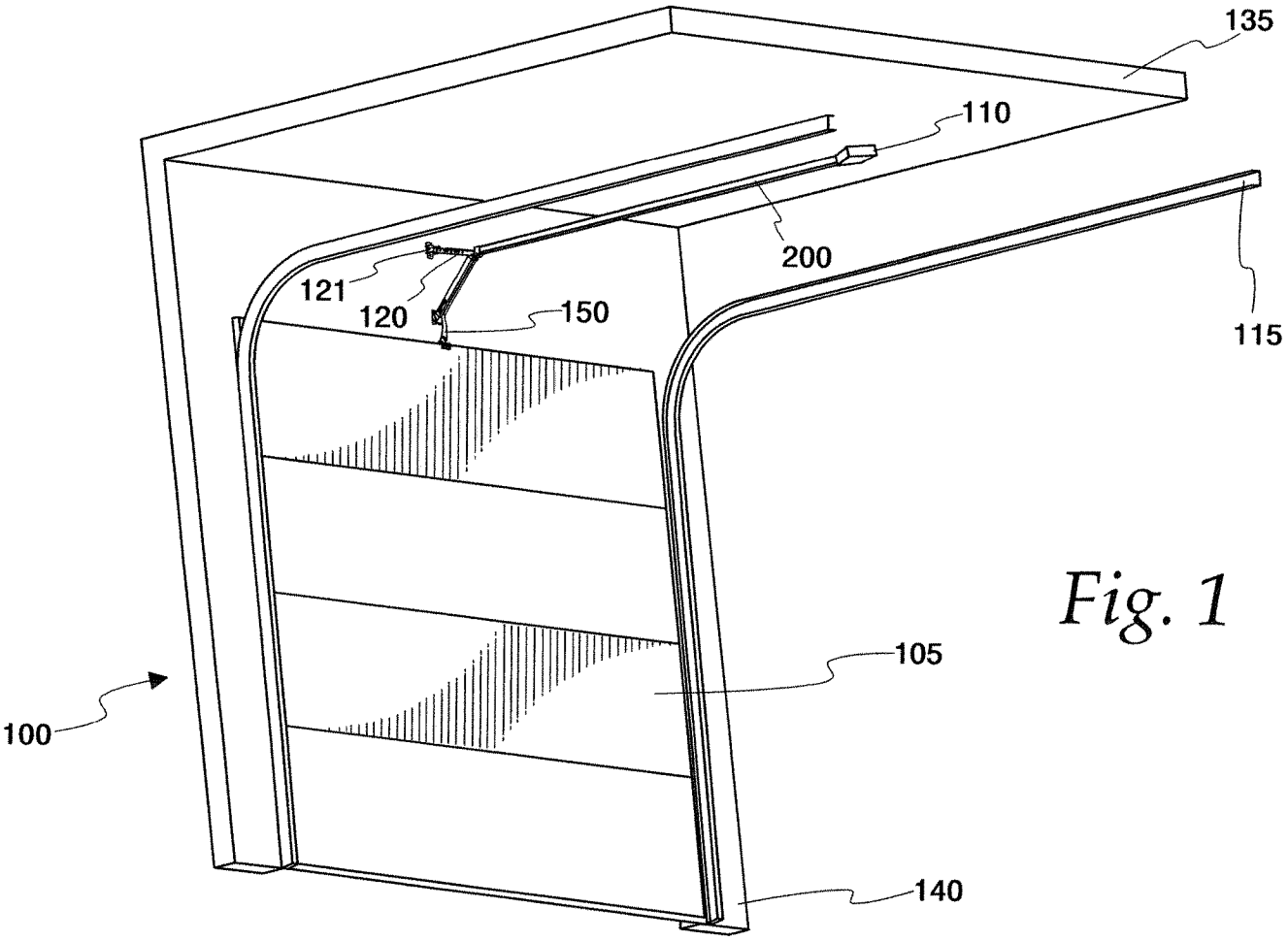
FIG. 1 comprises a perspective view of an example hinged rail operator system as configured in accordance with various embodiments of the invention.
Figure 3A:
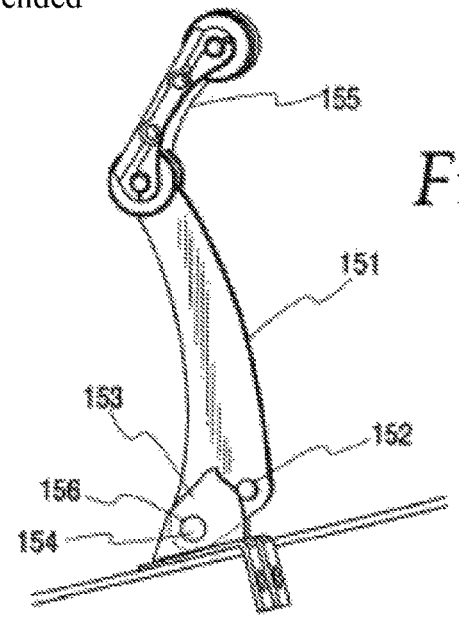
FIG. 3a comprises a perspective view of an example trolley as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required.

It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a guide rail having first and second rail sections is configured to guide a trolley used to move a movable barrier. In one approach, the apparatus includes an operator for controlling movement of the movable barrier, a trolley operably connected to a movable barrier and the operator, a guiding rail that guides movement of the trolley, and a support structure that connects to the guiding rail to provide additional support during the travel of the movable barrier. In operation, the operator controls movement of the trolley along the length of the guiding rail.

So configured, various approaches to such a guiding rail apparatus provide improved tracking of the movement of the barrier along the guiding rail during movement of the movable barrier. This improved tracking generally results in reduced forces exerted on the rail by the movable barrier while raising or lowering the barrier. The reduced forces in turn allow the use of lower strength materials for the rail, which provides for a lower cost assembly. In addition, various aspects of the guiding rail apparatus reduce the weight of the movable barrier being supported by the ceiling. In one example, the weight of the movable barrier is substantially supported by a support member anchored to a portion of the building structure above the barrier opening (or header) as opposed to mounting the portion of the guiding rail closest to the barrier opening to the ceiling. In such an example, the guiding rail can then be mounted to a lower portion of the header, thus resulting in a simplified installation process. In other applications, the use of a guiding rail in situations in which the header is substantially large (commonly known as high-lift doors) can eliminate the need for additional supporting panels during operation. In another aspect, power can be transmitted from the operator through the guiding rail to a photobeam system associated with the barrier for detecting objects in the path of travel of the movable barrier. So configured, an additional power cord is not needed to operate the photobeam system.

Referring now to the drawings, and in particular to FIG. 1, a hinged rail barrier operator system 100 can include, for example, a movable barrier 105, an operator 110, support rails 115, support member 120, support member securing device 122, upper support member 130 (FIGS. 5-9), upper support member securing device 132 (FIGS. 7-9), ceiling structure 135, building structure 140, trolley 150, and guiding rail 200.

The operator 110 serves to cause movement of a variety of other components of the operator system. Such operators 110 are well known in the art and generally include a motor to power the operator and a spool tensioner to maintain appropriate tension in the operator cables. For the sake of brevity and the preservation of focus, additional details will not be presented here regarding such well understood peripheral structure. The operator 110 is attached to the ceiling structure 135 by the upper support member 130 and the upper support member securing device 132 as shown in FIG. 5 and discussed below. The trolley 150 is coupled to the movable barrier 105 and operably connected to the operator 110. The trolley 150 operatively engages the guiding rail 200. The movable barrier 105 operatively engages the support rails 115 to travel along the rails. The support member 120 is attached to the building structure 140 by the support member securing device 122 and is attached to the guiding rail 200 at the second end, which is described in further detail below.

In operation, when the operator 110 causes movement of the trolley 150, the trolley 150 traverses the guiding rail 200, thus causing the movable barrier 105 to traverse the support rails 115 until the movable barrier 105 is in an open or closed position. In one example, the trolley 150 transverses the hinged portion of the guiding rail 200 without a loss in speed. The details of this travel are described in further detail below.

Referring now to FIGS. 1, 2, 3a, 3b, and 3c, an example of the trolley 150 is provided in further detail. The trolley 150 includes a trolley arm 151, a mechanical stop 152, a movable barrier support structure 153, and a trolley wheel 155. The trolley wheel 155 operatively engages the guiding rail 200 through a track system contained in the guiding rail 200. The track system is well known in the art and other approaches to engaging the guiding rail 200 with the trolley 150 can be applied. For example, the trolley wheel 155 as illustrated includes two sets of wheels on either side of a curved middle portion. In another example, the trolley may include a low-friction pads on either end, which pads allows the trolley to transverse the guiding rail 200 by sliding across a surface contained within the guiding rail 200. The trolley arm 151 includes an aperture 156. The movable barrier support structure 153 includes a pin 154 to rotatably connect the trolley arm 151 to the movable barrier support structure 153. The aperture 156 of the trolley arm 151 is sized appropriately to allow the pin 154 of the movable barrier support structure 153 to pass through, thus allowing the trolley arm 151 to rotate about this pin 154. The movable barrier support structure 153 is secured to the movable barrier 105 through traditional methods, including bolting, nailing, stapling, gluing, welding, and/or other known methods. In one approach, the mechanical stop 152 of the trolley arm 151 is affixed to the trolley arm 151 and protrudes from the surface of the trolley arm 151. The mechanical stop 152 is constructed of a metal or any material having similar strength characteristics as the trolley 150.

In operation, when the operator 110 causes the trolley 150 to move the movable barrier 105 towards an open or closed position, the trolley wheel 155 traverses the distance of the guiding rail 200. The angle between the trolley arm 155 and the guiding rail 200, as well as the angle between the trolley arm 151 and the movable barrier 105, differ throughout the course of travel of the trolley 150. In one example and as seen in FIG. 3b, when the angle formed between the inner surface of the movable barrier 105 and the bottom surface of the trolley arm 151 exceeds a determined amount, the mechanical stop 152 abuts an upper portion of the movable barrier support structure 153 to restrict the angle from further increasing, thus limiting the potential forces exerted on the trolley 150 by the weight of the movable barrier 105. Generally speaking, these angles occur when the operator 110 is vertically displaced due to the varying forces exerted upon it, and immediately after the trolley 150 traverses a first rail section 210. The mechanical stop 152 therefore prevents the trolley arm 155 from swinging into the guiding rail 200 during this movement. In another example and as seen in FIG. 2c, when the angle formed between the inner surface of the movable barrier 105 and the bottom surface of the trolley arm 151 is less than a determined amount, the mechanical stop 152 abuts a lower portion of the movable barrier support structure 153 to restrict the angle from further decreasing, again limiting the potential forces exerted on the trolley 150 by the weight of the movable barrier 105.

Referring again to FIGS. 2 4, 5a, and 5b, an example of the guiding rail 200 is provided in further detail. The guiding rail 200 includes a first rail section 210, a second rail section 220, and a hinged connecting point 230. The first rail section 210 and second rail section 220 are operably connected to the hinged connecting point 230 to allow the trolley 150 to transverse the rail sections 210, 220 upon operation of the operator 110. In one aspect, the first rail section 210 is operably attached to the operator 110 at its second end.

Figure 4:
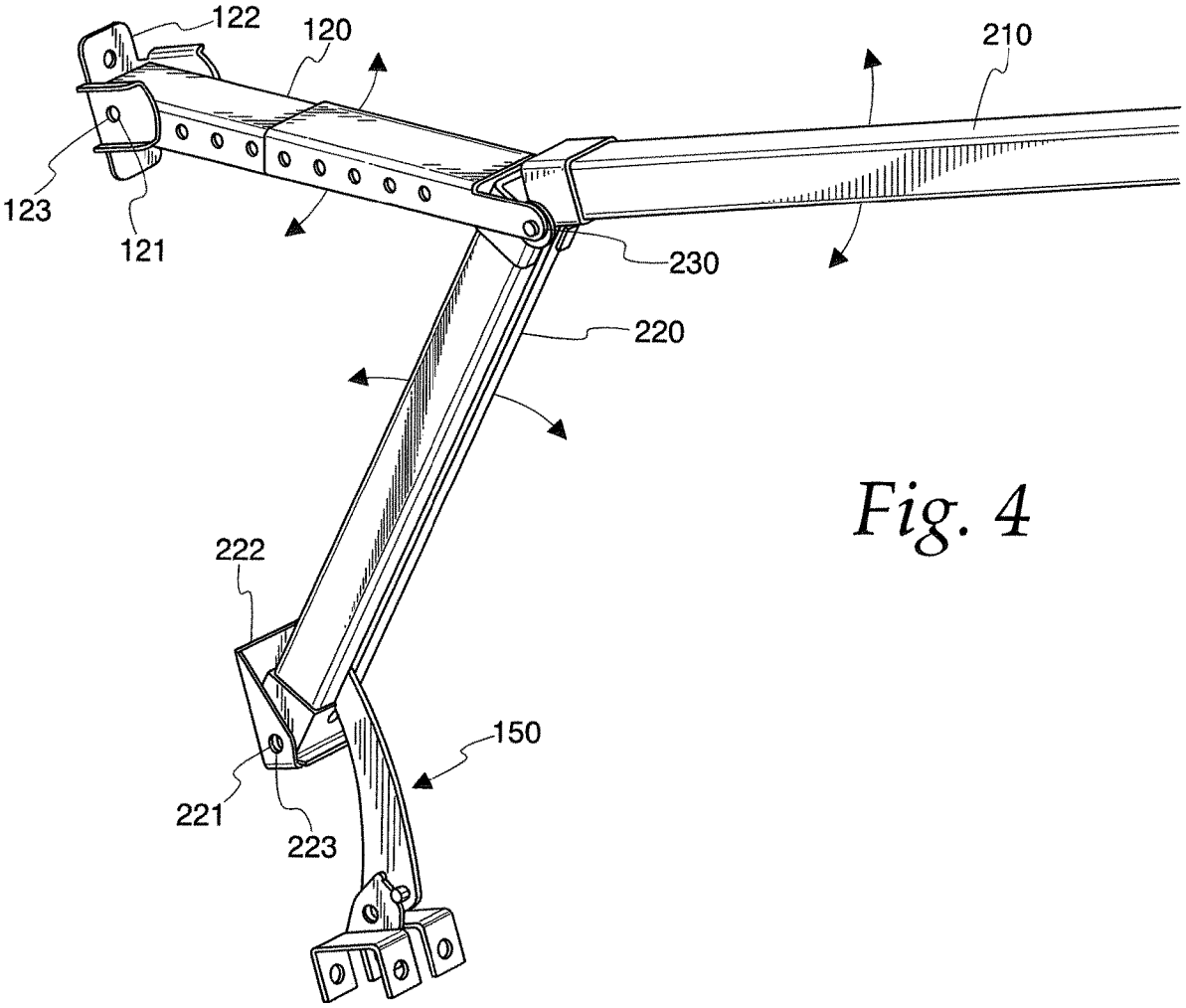
FIG. 4 comprises a schematic view of a portion of an example hinged rail operator system as configured in accordance with various embodiments of the invention.
Figure 5A:
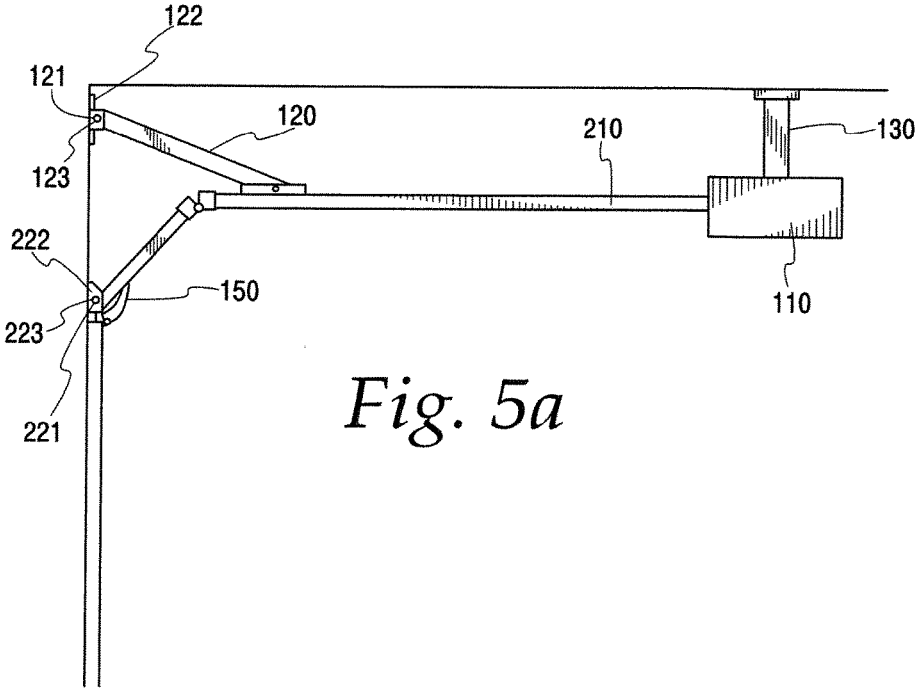
FIG. 5a comprises a side view of a hinged rail operator system with a first example support configuration as configured in accordance with various embodiments of the invention.
Figure 5B:
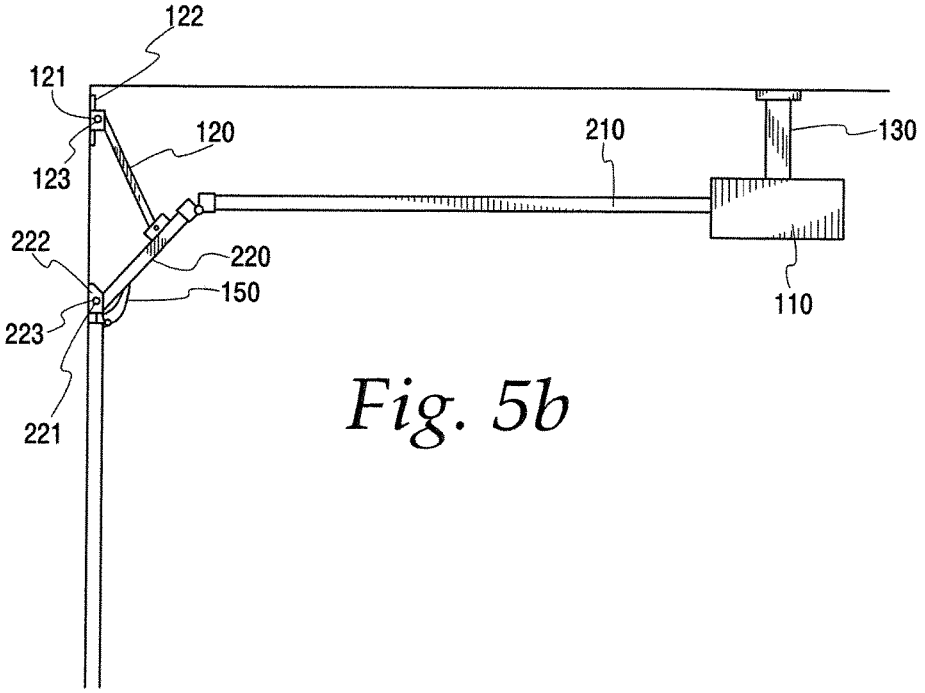
FIG. 5b comprises a side view of a hinged rail operator system with a second example support configuration as configured in accordance with various embodiments of the invention.

Referring now to FIGS. 4, 5a, and 5b, the second rail section 220 is provided in further detail. The second rail section 220 is pivotally secured to the building structure 140 by the second rail section securing device 222. In the illustrated example, the second rail section 220 includes an aperture 221. The second rail section securing device 222 includes a pin 223. The aperture 221 of the second rail section 220 is sized appropriately to allow the pin 223 of the second rail section securing device 222 to pass through, thus allowing the second rail section 220 to pivot about this pin 223. The second rail section securing device 222 is secured to the building structure 140 through traditional methods, including bolting, nailing, stapling, gluing, welding, and/or other known methods.

As previously mentioned and referring again to FIGS. 4, 5a, and 5b, the support member 120 is attached to the building structure 140 by the support member securing device 122. In this example, the support member 120 includes an aperture 121. The support member securing device 122 includes a pin 123. The aperture 121 of the support member 120 is sized appropriately to allow the pin 123 of the support member securing device 122 to pass through, thus allowing the support member 120 to rotate about this pin 123. The support member securing device 122 is secured to the building structure 140 through traditional methods, including bolting, nailing, stapling, gluing, welding, and/or other known methods.

In one example, and as seen in FIG. 4, the opposite end of the support member 120 is secured to the hinged connecting point 230 of the guiding rail 200. This opposite end of the support member 120 is secured to the outer surface of the hinged connecting point 230 to allow continuous movement of the trolley 150 as it traverses the entire length of the guiding rail 200.

In another example, and as seen in FIG. 5a, the opposite end of the support member 120 is secured to the first rail section 210 and is configured to allow continuous movement of the trolley 150 as it traverses the entire length of the guiding rail 200. In another example, and as seen in FIG. 5b, the opposite end of the support member 120 is secured to the second rail section 220 and is configured to allow continuous movement of the trolley 150 as it traverses the entire length of the guiding rail 200.

Figure 6:
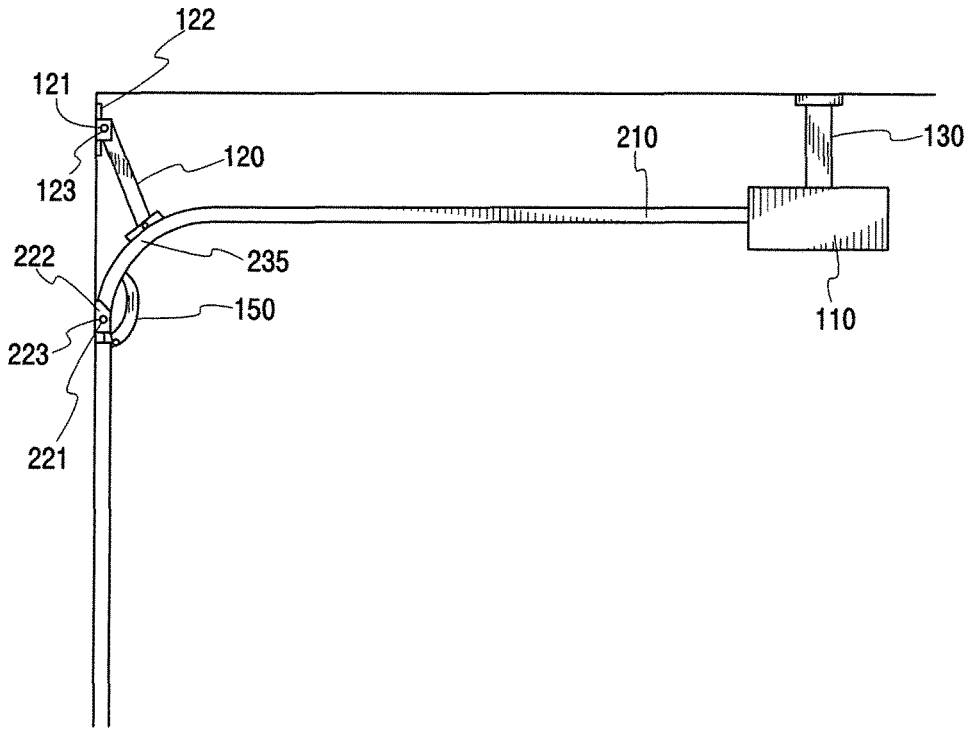
FIG. 6 comprises a side view of a guiding rail operator system with a curved guiding rail as configured in accordance with various embodiments of the invention.

In another example and as provided in FIG. 6, the second rail section 220 replaced by a curved section 235 approximately matching the curvature of the support rails 115 (not shown). The curved section 235 connects the first rail section 220. Such a construction may result in separate rail sections being connected to one another to form the guiding rail 200. Alternatively, the guiding rail 200 may be constructed to consist of a single member having a first and second rail sections. In still another approach, the first rail section and second rail sections are two separate and optionally straight sections connected by a curved section, in which case, each section may be physically separate pieces or constructed as a single, integral rail. In any of the above approaches, the rail 200 may be constructed of separate pieces or as a single, integral rail.

Figure 7:
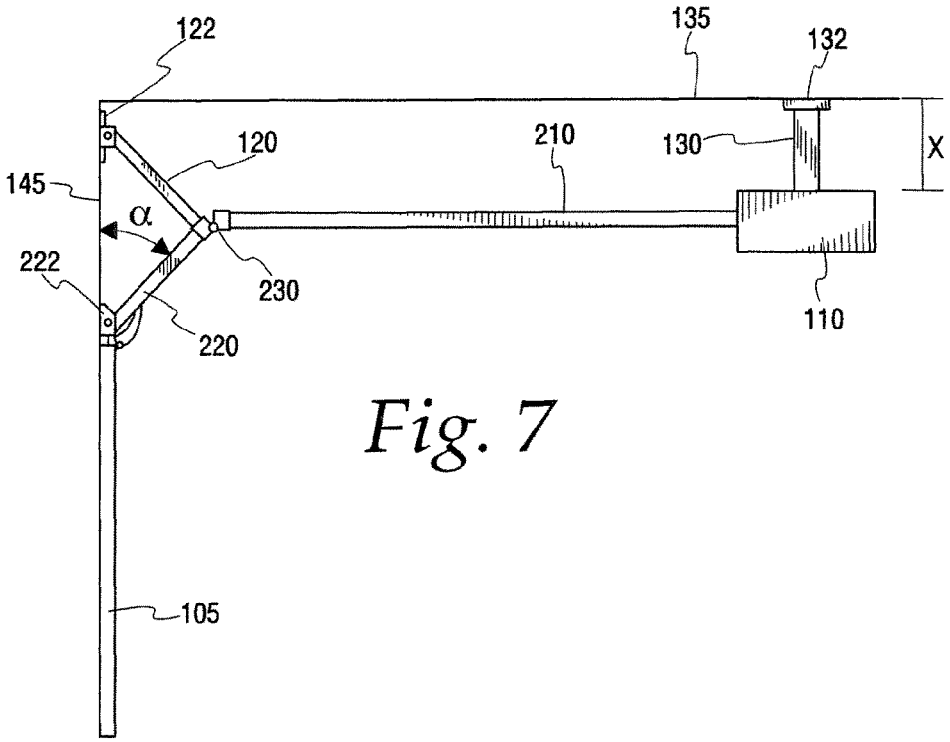
FIG. 7 comprises a side view of a hinged rail operator system with a third example support configuration as configured in accordance with various embodiments of the invention.
Figure 8:
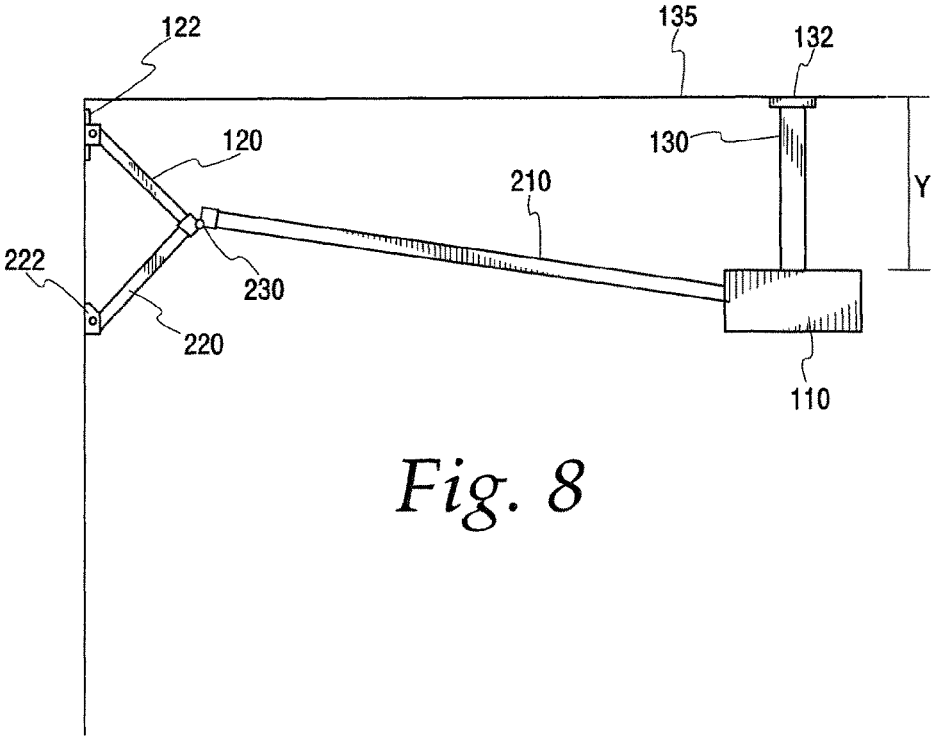
FIG. 8 comprises a side view of a hinged rail operator system with a fourth example support configuration as configured in accordance with various embodiments of the invention.

In operation, when the operator 110 causes the movable barrier 105 to move from a closed to an open position or vice-versa, the support member 120 counteracts the forces exerted on the guiding rail 200. The support member 120 is pivotally secured to the support member securing device 122 through the pin 123 to counteract the forces exerted on the guiding rail 200 through traditional methods, including bolting, nailing, stapling, gluing, welding, and/or other known methods. An example of the connection between the operator 110 to the ceiling structure 135 is illustrated in FIGS. 7 and 8. The operator 110 is attached to one end of the upper support device 130. The second end of the upper support member 130 is attached to the upper support member securing device 132, which is in turn secured to the ceiling structure 135. The upper support member securing device 132 is secured to the ceiling structure 135 through traditional methods, including bolting, nailing, stapling, gluing, welding, and/or other known methods.

In operation, when the movable barrier 105 effects a force on the trolley 150, the trolley 150 in turn effects a force on the guiding rail 200. In previous arrangements, to the extent this force was a vertical downward force, the guiding rail needed to be supported directly by the ceiling or end wall or through the upper support device 130 of the operator 110. In various approaches described herein, instead, a tensile force results on the support member 120 to counteract this vertical downward pull on the guiding rail 200. To the extent that this force on the guiding rail 200 has a vertical component not offset by the support member 120, the support member 120 will support the remaining portion of the force, which should be reduced because the largest forces are experienced where the trolley is disposed closest to the barrier opening. When providing a tensile support, the support member securing device 122 transfers this force on the support member 120 into the building structure 140, thus properly displacing the weight of the movable barrier 105 from the first section 210 of the guide rail 200 throughout its direction of travel. So configured, the guide rail 200 needs less structural strength and support to adequately support the trolley 150 and movable barrier 105.

In one example, the upper support member 130 is made of a non-rigid material such as, for example, rubber or springs. When the vertical forces exerted by the movable barrier 105 are reduced or minimized (for example, when the movable barrier is in the closed position or is traveling along the second rail section 220 of the guide rail 200), the non-rigid upper support member 130 returns to its original orientation, as shown by the distance x in FIG. 7. When the movable barrier 105 travels towards an open position along the first section 210 of the guide rail 200, the upper support member 130 at least partially counteracts the vertical forces by elongating as the vertical forces increase. Upon the movable barrier reaching the fully open position, the upper support member 130 counteracts the vertical forces by elongating to a maximum distance as depicted by the distance y in FIG. 8. The elastic nature of the upper support member 130 is desirable in some applications because it absorbs the vertical forces exerted by the movable barrier 105 and thus reduces the forces exerted on the upper support member securing device 135, reduces the overall system cost, and allows for easier replacement in the event the support member 120 fails. In another example, the upper support member 130 is made of a rigid material such as, for example, a metal, metal alloy, or plastic.

Figure 9:
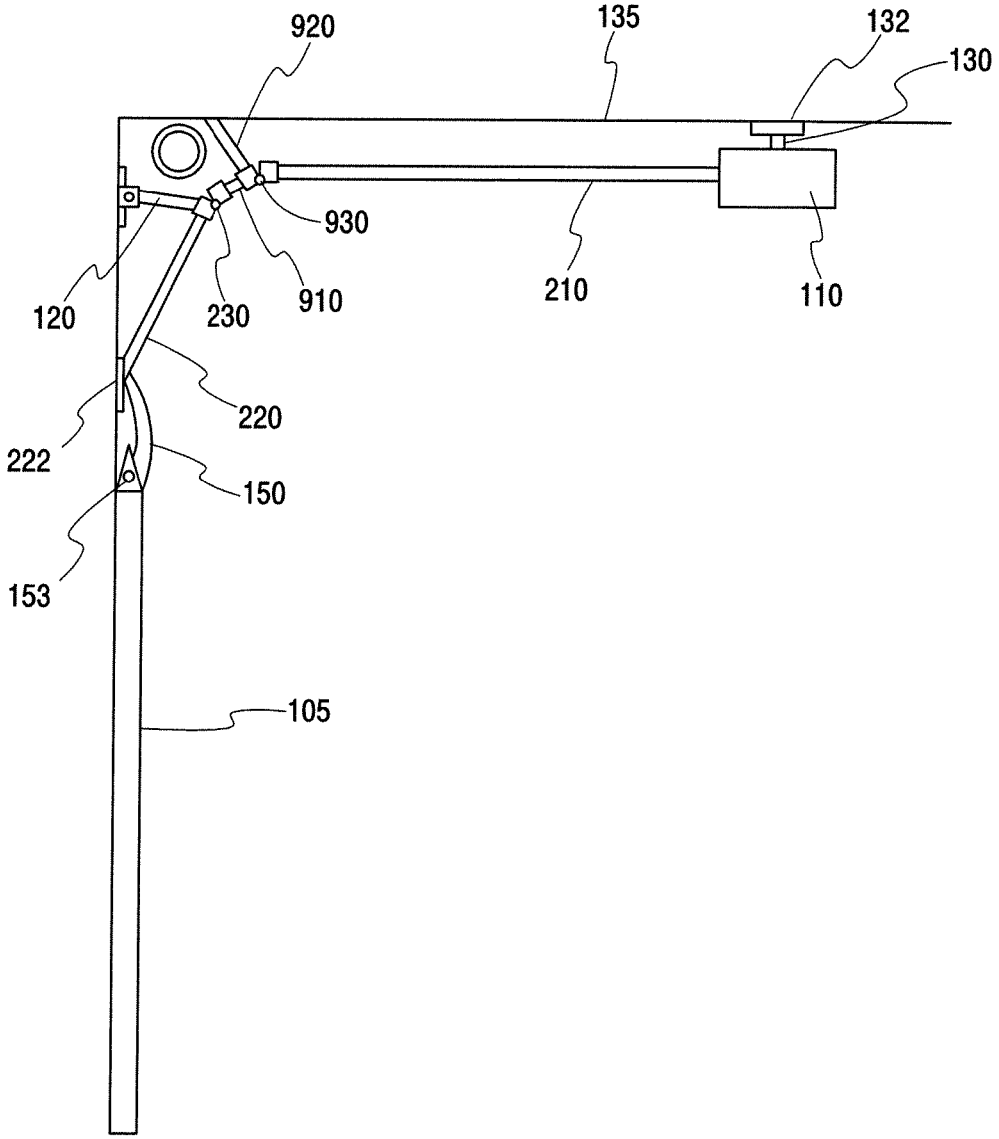
FIG. 9 comprises a side view of an example high-lift hinged rail operator system as configured in accordance with various embodiments of the invention.

Referring now to FIG. 9, another example guiding rail 200 includes a third rail section 910. This example can be used in situations where the movable barrier 105 has an elongated headroom to traverse. The third rail section 910 is connected to either the first rail section 210 or second rail section 220 at an end point of either rail section through an additional hinged connecting point 930. The additional hinged connecting point 930 is connected to the additional support member 920, which is attached to the ceiling structure 135 using the same methods as previously described with regards to the second rail section securing device 222 as depicted in FIGS. 4 and 5. The hinged rail barrier operator system 100 performs in the same manner as previously described, with the exception of the trolley 150 traversing the additional hinged connecting point 930 and the third rail section 910.

Figure 10:
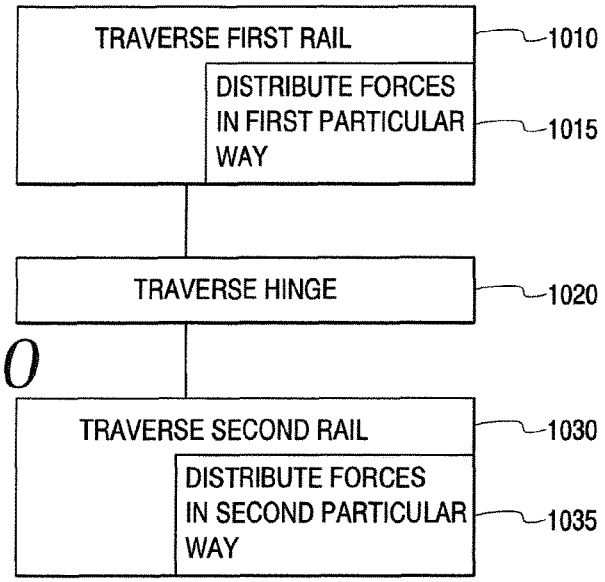
FIG. 10 comprises a flow chart of an example method of operating a movable barrier as configured in accordance with various embodiments of the invention.

Referring now to FIG. 10, an example of a method of operating a movable barrier is described. The trolley 150, in response to actuation of the operator 110, traverses 1010 one of the rail sections 210, 220 of the guiding rail 200. Upon movement of the trolley 150, the weight of the hinged door 105 exerts a force on the guiding rail 200. The support member 120 and the upper support member 130 counteract 1015 these forces caused by the movable barrier 105 in a first particular way by distributing the forces into the building structure 140 and the ceiling structure 135. The trolley 150 then traverses 1020 the hinged connecting point 230, which is configured to allow the trolley wheel 155 to traverse the rail sections smoothly and without a loss of speed. More specifically, a portion of the trolley wheel 155 has a scalloped or curved edge, which allows the trolley wheel 155 to remain in contact with the guiding rail 200 throughout operation and therefore provides for the smooth travel. The trolley 150 then traverses 1030 the second of the rail sections 210, 220 of the guiding rail 200. Upon the further traversal 1030 of the trolley 150, the weight of the hinged door 105 exerts a force on the guiding rail 200 in a second direction and distribution different than the first. The support member 120 and the upper support member 130 then counteract 1035 these forces caused by the movable barrier 105 in a second particular way by distributing the forces into the building structure 140 and ceiling structure 135.

Those having skill in the art will recognize that the steps of traversing 1010, 1030 the rail sections can include the trolley 150 beginning at the first rail section 210 (thus resulting in the movable barrier moving into a closed position) or the second rail section 230 (thus resulting in the movable barrier moving into an open position). As the trolley traverses the first rail section 210, the upper support member 30 is primarily, but not exclusively, responsible for distributing the forces of the movable barrier 105 into the ceiling structure 135. When the trolley traverses the second rail section 230, the support member 120 is primarily, but not exclusively, responsible for distributing the forces of the movable barrier 105 into the building structure 140.

In an alternative example, and in accordance with FIGS. 9 and 10, the method of operating the movable barrier includes the additional steps of traversing a second hinged connecting point 930 and a third rail section 910 after the trolley 150 has traversed the first or second rail portions 210, 220. Because of the previously-mentioned configuration of the trolley wheel 155, a smooth transition occurs when the trolley traverses the second hinged connecting point 930 and third rail section 910, therefore minimizing both the amount the system 100 moves and bounces during operation as well as any loss of speed of the trolley.

Figure 11:
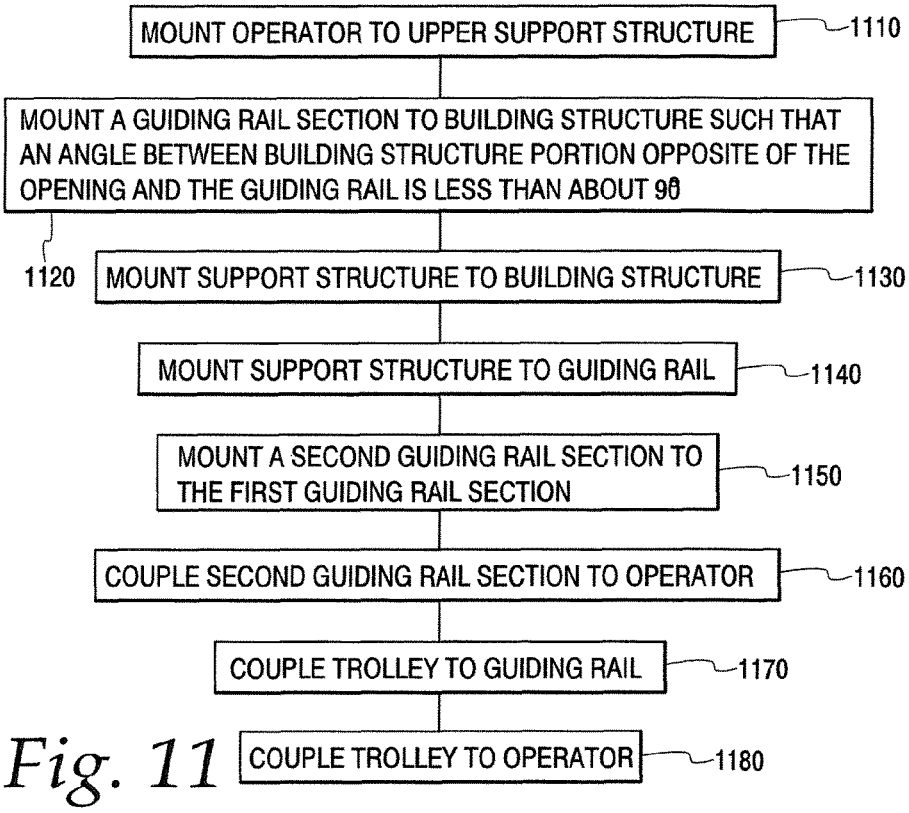
FIG. 11 comprises a flow chart of an example method of installing a movable barrier operator as configured in accordance with various embodiments of the invention.

Referring now to FIG. 11, an example of a method of installing a movable barrier operator configured to move a barrier to open and close an opening in a building structure is provided in further detail. The operator 110 is mounted 1110 to the upper support structure 135 with the upper support member 130. It will be appreciated that this upper support member 130 can be either a rigid material or non-rigid material as previously described. The second rail section 220 is mounted 1120 to the building structure 140 above the opening through the second rail section securing device 222 as previously described such that an angle between the building structure portion 145 opposite of the opening and the second rail section 220 that is less than about 90 degrees is formed. The angle formed between the building structure portion 145 opposite of the opening and the second rail section is denoted by the symbol a, as depicted in FIG. 7. The first end of the support member 120 is mounted 1130 to the building structure 140 through the support member securing device 122 as previously described. The second end of the support member 120 is mounted 1140 to the guiding rail 200 as previously described in FIGS. 4, 5, and 6. The first rail section 210 is mounted 1150 to the second rail section 220 through the hinged connecting point 230 as seen in FIG. 4. The first rail section 210 is also coupled 1160 to the operator. The trolley 150 is coupled 1170 to the guiding rail 200 and coupled 1180 to the operator 110 such that when in motion, the trolley 150 traverses the guiding rail 200 with minimal resistance. As previously stated, the trolley 150 can be equipped with wheels for traversing the guiding rail 200 or low-friction pads.

Figure 12:
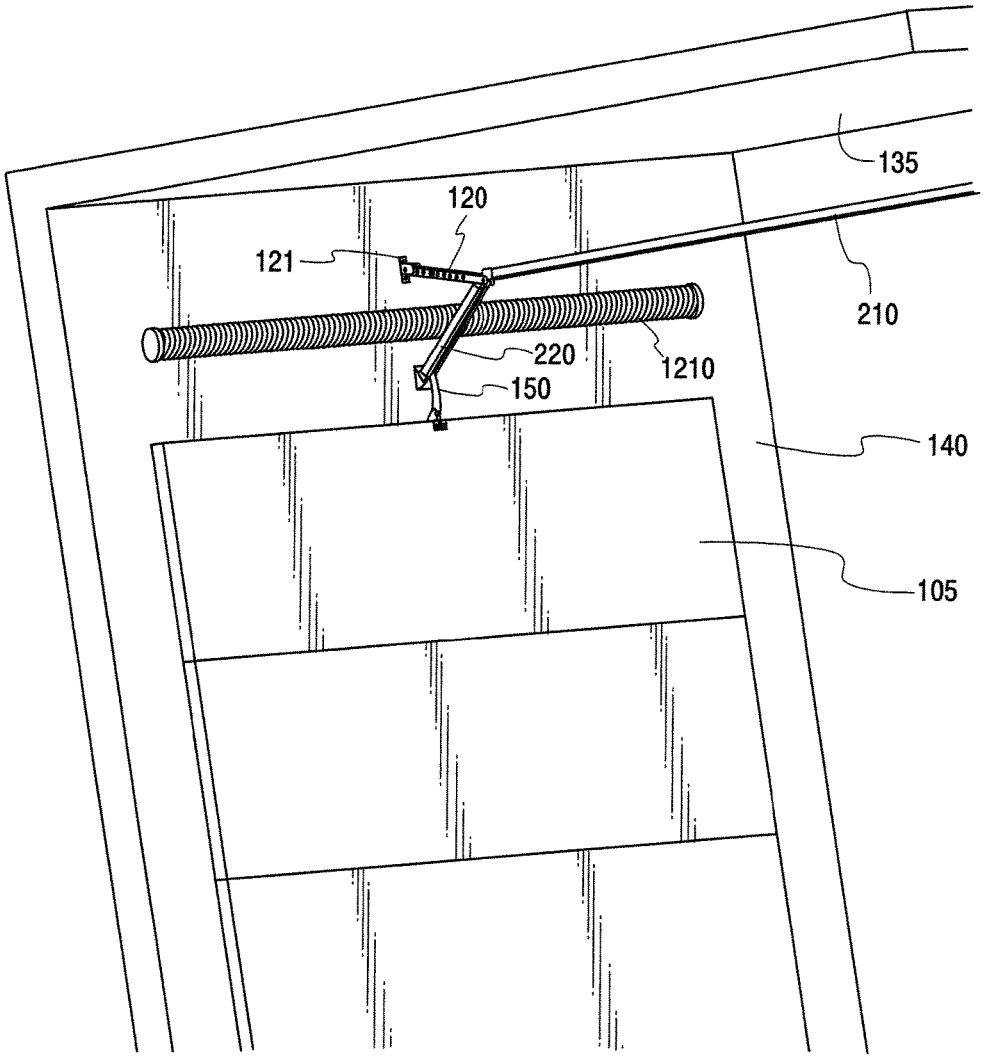
FIG. 12 comprises schematic view of a portion of an example hinged rail operator system as configured in accordance with various embodiments of the invention.

In another example, and in accordance with FIG. 12, a movable barrier support shaft 1210 and counterbalance spring are configured to be installed through an opening defined by the building structure 140, support structure 120, and second rail section 220. The movable barrier support shaft 1210 with a counterbalance spring provides counterbalancing support to the movable barrier 105. This configuration results in reduced system size and allows installations in space-constrained areas.

Figure 13:
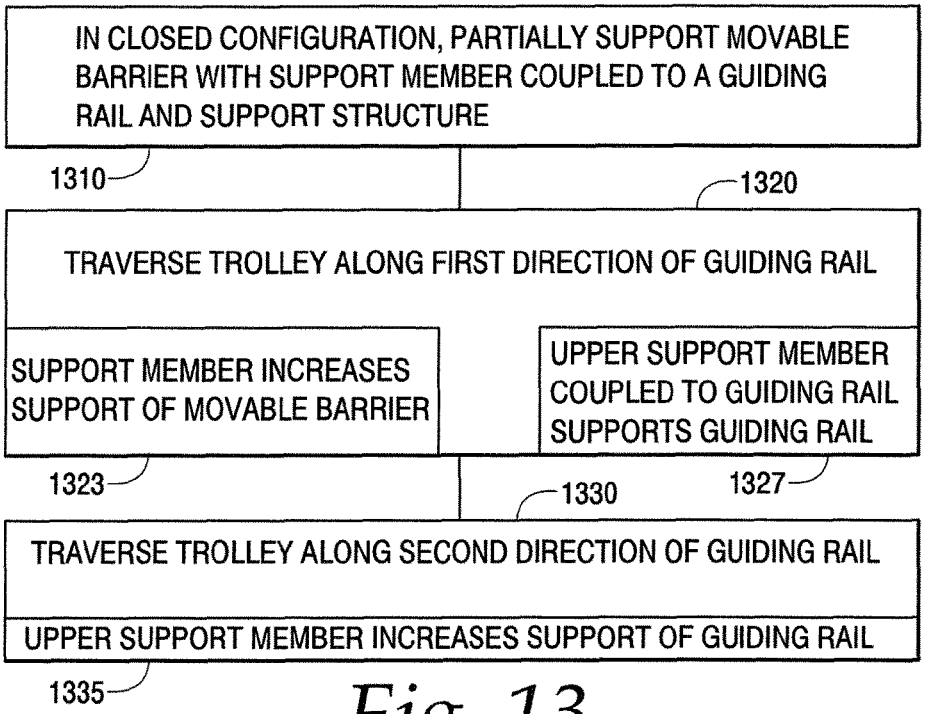
FIG. 13 comprises a flow chart of an example method of operating a movable barrier as configured in accordance with various embodiments of the invention.
Figure 14:
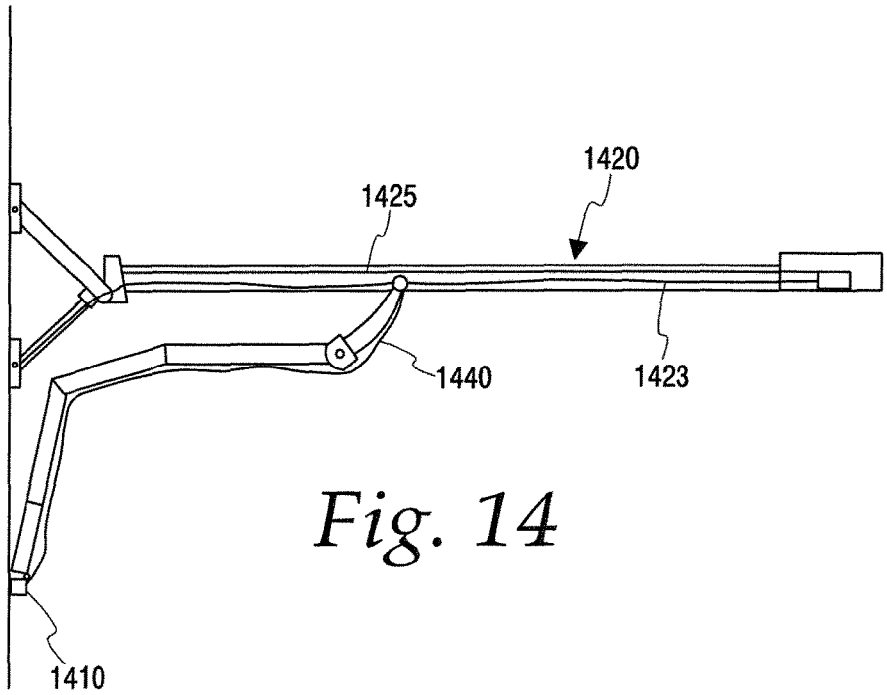
FIG. 14 comprises a side view of an example system for carrying power from the operator to a photobeam system as configured in accordance with various embodiments of the invention.

Referring now to FIG. 13, an example of a method of operating a movable barrier 1300 is provided in further detail. While the movable barrier 105 is in a closed position, the movable barrier 105 is supported 1310 in part by the guiding rail 200 through the support member 120 coupled to the guiding rail 200 at one end and the building structure 140 at the other end. As the movable barrier 105 moves towards an open position, the trolley 105 coupled to the movable barrier 105 traverses 1320 the guiding rail 200 in a first direction parallel to that of the second rail section 220. This traversing 1320 causes the support member 120 to increase support 1323 of the movable barrier 105 and causes the upper support member 130 to increase its support 1327 on the guiding rail 200 through its attachment to the ceiling support structure 135. As the movable barrier 105 continues towards an open position, the trolley 105 coupled to the movable barrier 105 traverses 1330 the guiding rail 200 in a second direction parallel to that of the first rail section 210. This traversing 1330 causes the upper support member 130 to further increase its support 1335 on the guiding rail 200 through its attachment to the ceiling support structure 135. So configured, the method will distribute the forces into the support members in a manner similar to those previously stated above. It is understood and appreciated that the support member 120 and upper support member 130 are secured to their respective support structures through the methods previously mentioned herein.

Figure 16:
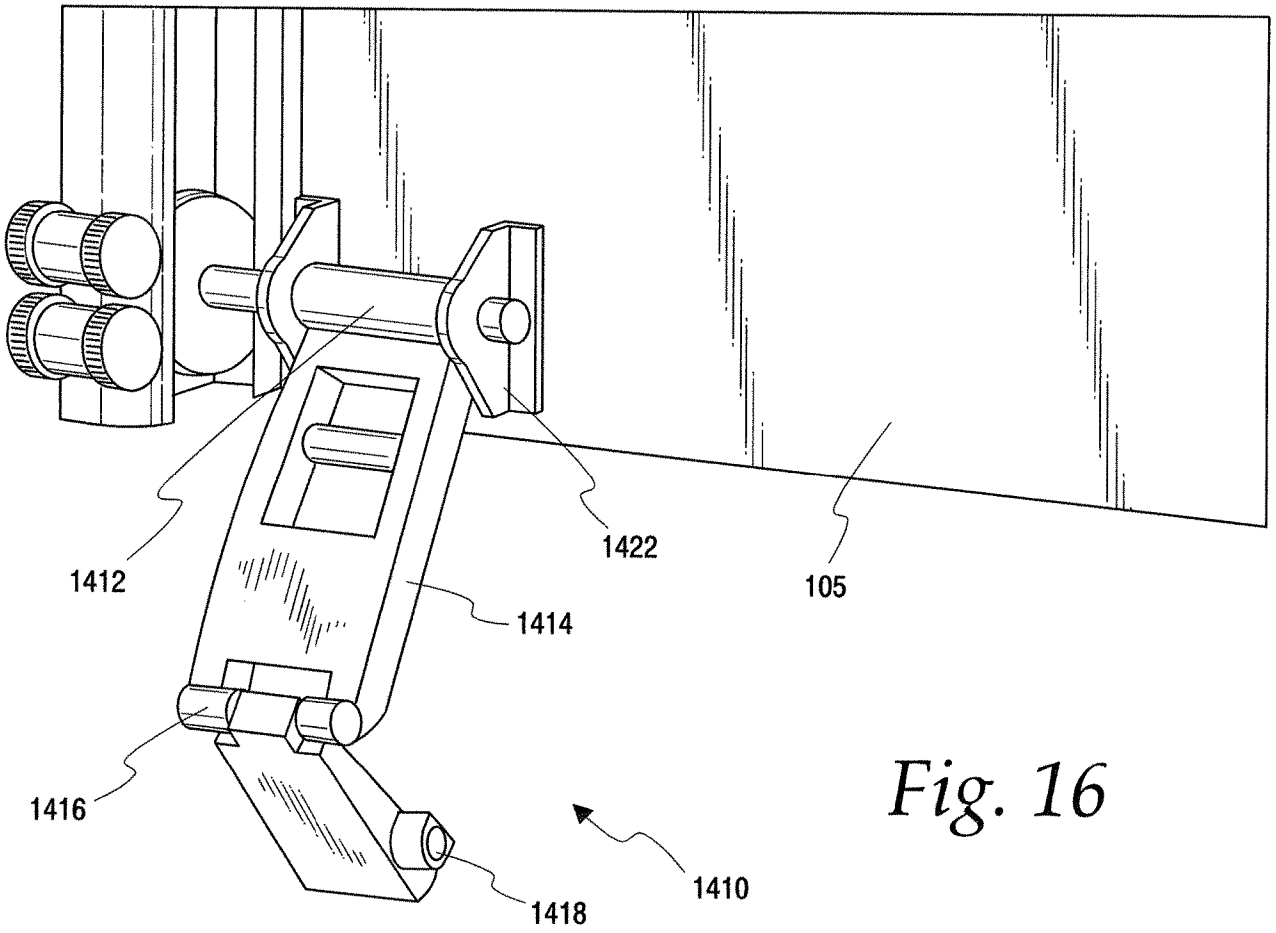
FIG. 16 comprises a schematic view of a portion of an example system for detecting objects in the movable barrier's path of travel.

In another example, and in accordance with FIGS. 14-17, a system for carrying power from the operator 110 to a photobeam system 1410 is provided in further detail. The system utilizes operator cables 1420, which include a first operator cable 1423 coupling the operator 110 to the trolley 150 in conjunction with a second operator cable 1425 beginning at the trolley 150 that extends to the end of the second rail portion 220 of the guiding rail 200 and back up the guiding rail 200 to the operator 110. So configured, the operator cables 1420 act as conductors that terminate at the trolley 150. In one example, the operator cables 1420 are constructed from nylon coated wire rope, but alternatively can be any suitable conducting material. To provide the photobeam system 1410 with power and communications capabilities, the two operator cables 1423 and 1425 are provided to the photobeam system 1410 through the use of additional cables 1440 that travel from the trolley 150 to the photobeam system 1410 as illustrated in FIG. 15. These additional cables 1440 are constructed from insulated copper wire, but alternatively can be any suitable conducting material. The additional cables 1440 include a photobeam system connector 1445 which plugs into the photobeam system 1410 to provide it with power. As illustrated in FIG. 16, in this example, the photobeam system 1410 includes a separate emitter 1418 and detector (not shown), each mounted to the bottom edge of the barrier. A photobeam system 1410 support plate 1414 is coupled to the movable barrier 105 through a hinge 1412. Additionally, the support plate 1414 is coupled to the emitter 1418 and detector through a hinge 1416 configured to fold up upon striking the floor when the barrier closes and optionally are configured to shut off in response to the hinging to conserve power.

So configured, there is no need to supply a cord that traverses the entire distance between the operator and the photobeam system separately from the operator system itself. In a first example, the operator cables 1420 are the same cables that connect the operator 110 to the trolley 150 and thus cause movement of the movable barrier 105 as well as power the photobeam system 1410. In a second example, the operator cables 1420 are distinct from the operator cables configured to cause movement of the movable barrier 105. These cables can then power a door-mounted obstacle detector system such as the example hinged photobeam illustrated in FIG. 16.

Referring now to FIG. 17, an example of an operator drum system 1700 is provided in further detail. The operator drum 1710 includes copper spring brushes 1720 that slide along a printed circuit board (not shown) mounted opposite the operator drum 1710. The operator cables 1420 are electrically coupled to the copper spring bushes 1720. The operator drum 1710 also contains grooves or ribs 1730, which allow the operator cables 1420 to rest therein during movement of the operator drum 1710. In operation, a motor effects rotation of the operator drum 1710 about its central axis, thus pulling on the cables, which pull on the trolley to cause movement of the movable barrier 105. Additionally, when the operator drum 1710 is provided with electricity, it provides the copper spring bushes 1720 with electricity, which in turn supplies the operator cables 1420 with electricity, thus providing electrical power to the operator cables 1420 and photobeam system 1410. The manner of powering and communicating with a barrier obstacle detector system over two wires is well known to those of skill in the art and need not be described herein.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

[1. An apparatus comprising:

a trolley operably connected to an operator configured to effectuate movement of a movable barrier through movement of the trolley;

a guiding rail configured to guide movement of the trolley, wherein the guiding rail includes a first rail section and a second rail section obliquely connected to each other with a hinged connecting point such that the trolley changes direction of travel when passing between the first rail section and the second rail section;

a support member having a first and second end, the first end of the support member being coupled to one or more of the rail sections of the guiding rail or a connection between the rail sections of the guiding rail, wherein the support member is configured to counteract forces exerted on the guiding rail by the trolley during movement of the movable barrier.]

[2. The apparatus of claim 1, wherein the second end of the support member is secured to a building structure.]

[3. The apparatus of claim 1, wherein the second rail section of the guiding rail includes a curved portion and a linear portion, wherein the curved portion of the second rail section is connected to the first rail section.]

4. [The apparatus of claim 1,] *An apparatus comprising:*

*a trolley configured to be connected to a movable barrier;*

*a guiding rail configured to guide movement of the trolley, wherein the guiding rail includes a first rail section and a second rail section obliquely connected to each other with a hinged connecting point such that the trolley changes direction of travel when passing between the first rail section and the second rail section;*

*a support member having a first and second end, the first end of the support member being coupled to one or more of the rail sections of the guiding rail or the hinged connecting point between the rail sections of the guiding rail, wherein the support member is configured to counteract forces exerted on the guiding rail by the trolley during movement of the movable barrier;* wherein the *trolley includes a* trolley [is] *arm rotatably* secured to the movable barrier by a hinge, wherein the [hinge] *trolley* includes a mechanical stop to restrict rotational motion between the trolley *arm* and the movable barrier to an angle range.

5. The apparatus of claim [1] *4*, further comprising a third rail section connected to the first rail section or the second rail [sections]*section* at a second connecting point.

6. The apparatus of claim [1] *4*, further comprising [the] *an* operator, wherein the operator is secured to a ceiling structure using an upper support member.

7. The apparatus of claim 6, wherein the upper support member comprises a rigid material.

8. The apparatus of claim 6, wherein the upper support member comprises an elastic material capable of conforming to its original state after a force is exerted upon it.

[9. A movable barrier operator apparatus comprising;

an operator, the operator being attached to an upper support structure, wherein the operator is configured to effectuate movement of a movable barrier;

a guiding rail having a first rail section and a second rail section, the first rail section having a first and second end, the first rail section being operably disposed adjacent to the operator at the first end;

a hinged guiding rail connecting portion, the connecting portion being operably attached to the first rail section at the second end of the first rail section;

the second rail section having a first and second end, the second rail section being operably attached to the connecting portion at the first end of the second rail section, the second rail section being operably supported by a building structure at the second end of the second rail section, wherein the first rail section and the second rail section are connected obliquely relative to each other when connected to the guiding rail connecting portion;

a trolley configured to travel the length of the guiding rail in response to control of the operator, the trolley further being configured to move a movable barrier during the trolley's movement along the guiding rail, wherein the trolley is configured to change direction of travel when passing between the first rail section and the second rail section;

a support member, the support member having a first and second end, the first end of the support member being attached to a building structure, the second end of the support member being coupled to one or more of the two rail sections or the connecting portion.]

[10. The apparatus of claim 9, wherein the operator is attached to the upper support structure with a rigid upper support member.]

[11. The apparatus of claim 9, wherein the operator is attached to the upper support structure with a non-rigid upper support member capable of conforming to its original state after a force exerted upon it is removed.]

[12. The apparatus of claim 9, wherein the guiding rail connecting portion comprises a curved rail section.]

[13. The apparatus of claim 9, wherein the first rail section comprises two sections connected by a second hinged connecting point.]

* * * * *